United States Patent
Tsuyuki et al.

(10) Patent No.: US 11,888,416 B2
(45) Date of Patent: Jan. 30, 2024

(54) PIEZOELECTRIC DRIVE DEVICE AND ROBOT

(71) Applicant: SEIKO EPSON CORPORATION, Tokyo (JP)

(72) Inventors: Yuichiro Tsuyuki, Matsumoto (JP); Yutaka Arakawa, Suwa-Gun Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 114 days.

(21) Appl. No.: 17/722,423

(22) Filed: Apr. 18, 2022

(65) Prior Publication Data

US 2022/0337177 A1 Oct. 20, 2022

(30) Foreign Application Priority Data

Apr. 19, 2021 (JP) ................. 2021-070183

(51) Int. Cl.
| | |
|---|---|
| *H02N 2/10* | (2006.01) |
| *H02N 2/02* | (2006.01) |
| *H02N 2/00* | (2006.01) |
| *H02N 2/04* | (2006.01) |
| *H02N 2/12* | (2006.01) |
| *B25J 9/12* | (2006.01) |

(52) U.S. Cl.
CPC ............. *H02N 2/103* (2013.01); *H02N 2/004* (2013.01); *H02N 2/006* (2013.01); *H02N 2/0015* (2013.01); *H02N 2/026* (2013.01); *H02N 2/028* (2013.01); *H02N 2/04* (2013.01); *H02N 2/12* (2013.01); *B25J 9/12* (2013.01); *B25J 9/126* (2013.01)

(58) Field of Classification Search
CPC ........ H02N 2/103; H02N 2/004; H02N 2/006; H02N 2/026; H02N 2/0015; H02N 2/028; H02N 2/04; H02N 2/12; B25J 9/12; B25J 9/126

See application file for complete search history.

(56) References Cited

U.S. PATENT DOCUMENTS

| | | | | |
|---|---|---|---|---|
| 8,907,733 B2 * | 12/2014 | Onishi | ................... | H04R 17/00 310/349 |
| 2017/0001306 A1 | 1/2017 | Arakawa et al. | | |

FOREIGN PATENT DOCUMENTS

| | | |
|---|---|---|
| JP | 2006280150 A | 10/2006 |
| JP | 2017017916 A | 1/2017 |

* cited by examiner

*Primary Examiner* — Emily P Pham
(74) *Attorney, Agent, or Firm* — Yu Gang

(57) ABSTRACT

A piezoelectric drive device includes two vibrators having vibrating portions with piezoelectric elements and transmitting portions placed in the vibrating portions and transmitting drive forces to a driven member (e.g. a slider), and a fixing portion having through holes (first through hole, second through hole) into which pins or screws are inserted. The two vibrators are placed adjoiningly along a drive direction of the slider, and the fixing portion is placed between the two vibrators and fixing the two vibrators.

6 Claims, 10 Drawing Sheets

PIEZOELECTRIC DRIVE DEVICE AND ROBOT

The present application is based on, and claims priority from JP Application Serial Number 2021-070183, filed Apr. 19, 2021, the disclosure of which is hereby incorporated by reference herein in its entirety.

BACKGROUND

1. Technical Field

The present disclosure relates to a piezoelectric drive device and a robot including a piezoelectric drive device.

2. Related Art

A drive device with ultrasonic motor in JP-A-2006-280150 discloses a configuration in which an ultrasonic motor is fixed to a movable table by a plurality of bolts and a piezoelectric element, a coil spring, etc. held by a case are placed within the ultrasonic motor.

However, in JP-A-2006-280150, the case holding the piezoelectric element, the coil spring, etc. is provided within the ultrasonic motor, and there is a problem that downsizing of the ultrasonic motor is difficult.

SUMMARY

A piezoelectric drive device includes two vibrators having vibrating portions having piezoelectric elements and transmitting portions placed in the vibrating portions and transmitting drive forces to a driven member, and a fixing portion having a through hole into which a pin or a screw is inserted, wherein the two vibrators are placed adjoiningly along a drive direction of the driven member, and the fixing portion is placed between the two vibrators and fixing the two vibrators.

A robot includes the above described piezoelectric drive device.

DESCRIPTION OF EXEMPLARY EMBODIMENTS

1. First Embodiment

Figure 1:
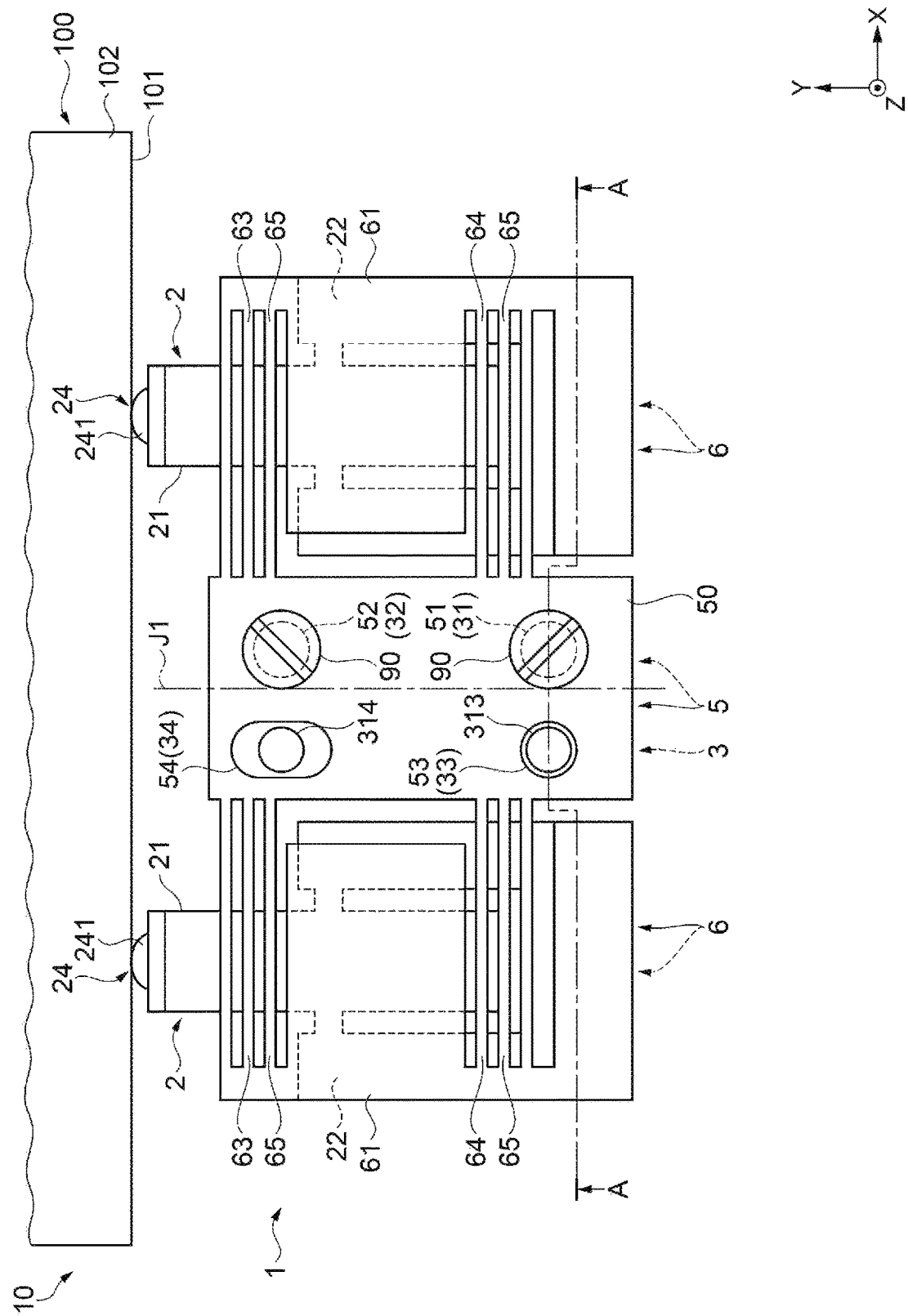
FIG. 1 is a plan view showing a piezoelectric drive device and a piezoelectric motor according to a first embodiment.
Figure 2:
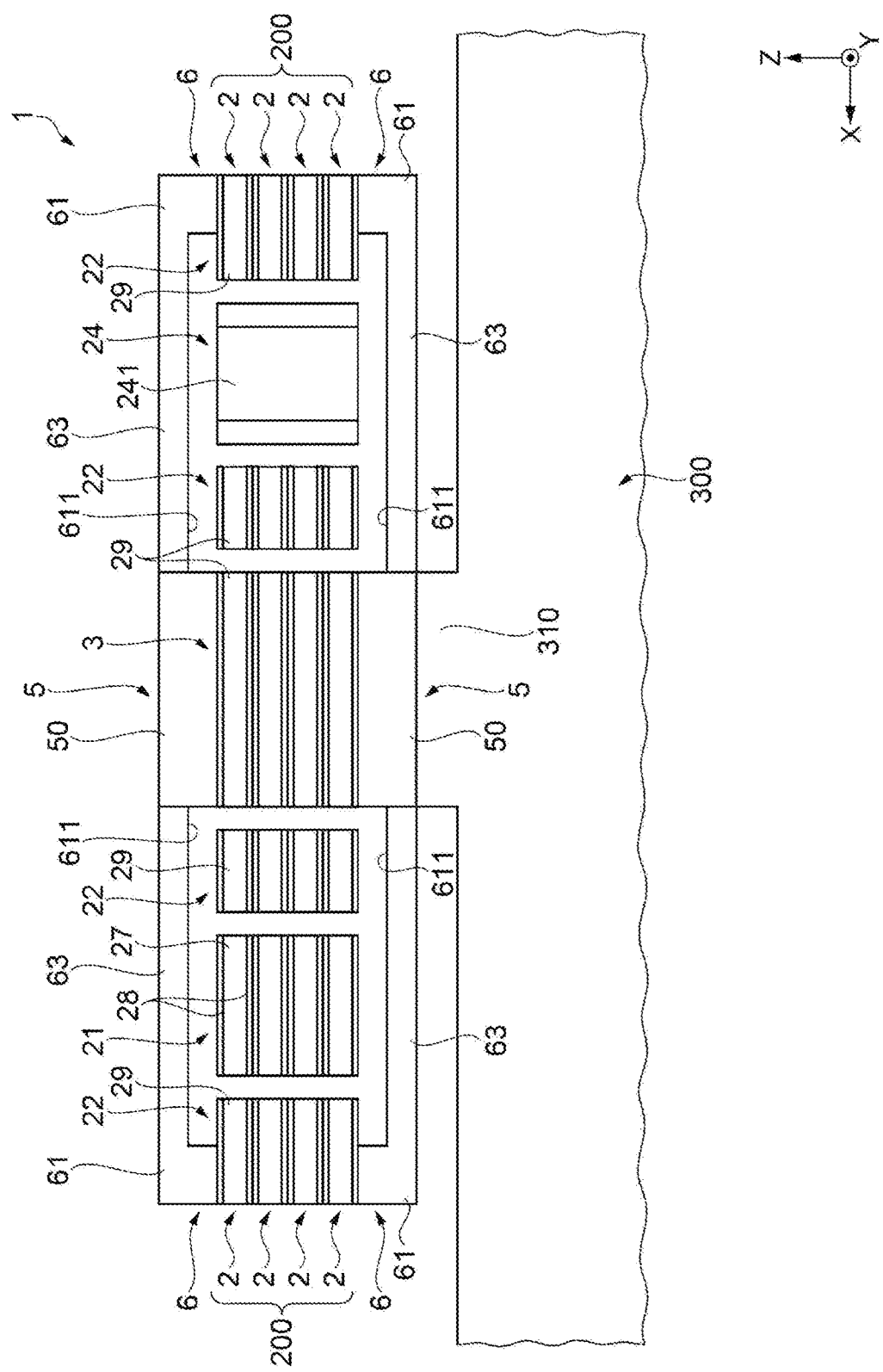
FIG. 2 is a side view showing the piezoelectric drive device as seen from a transmitting portion side.
Figure 3:
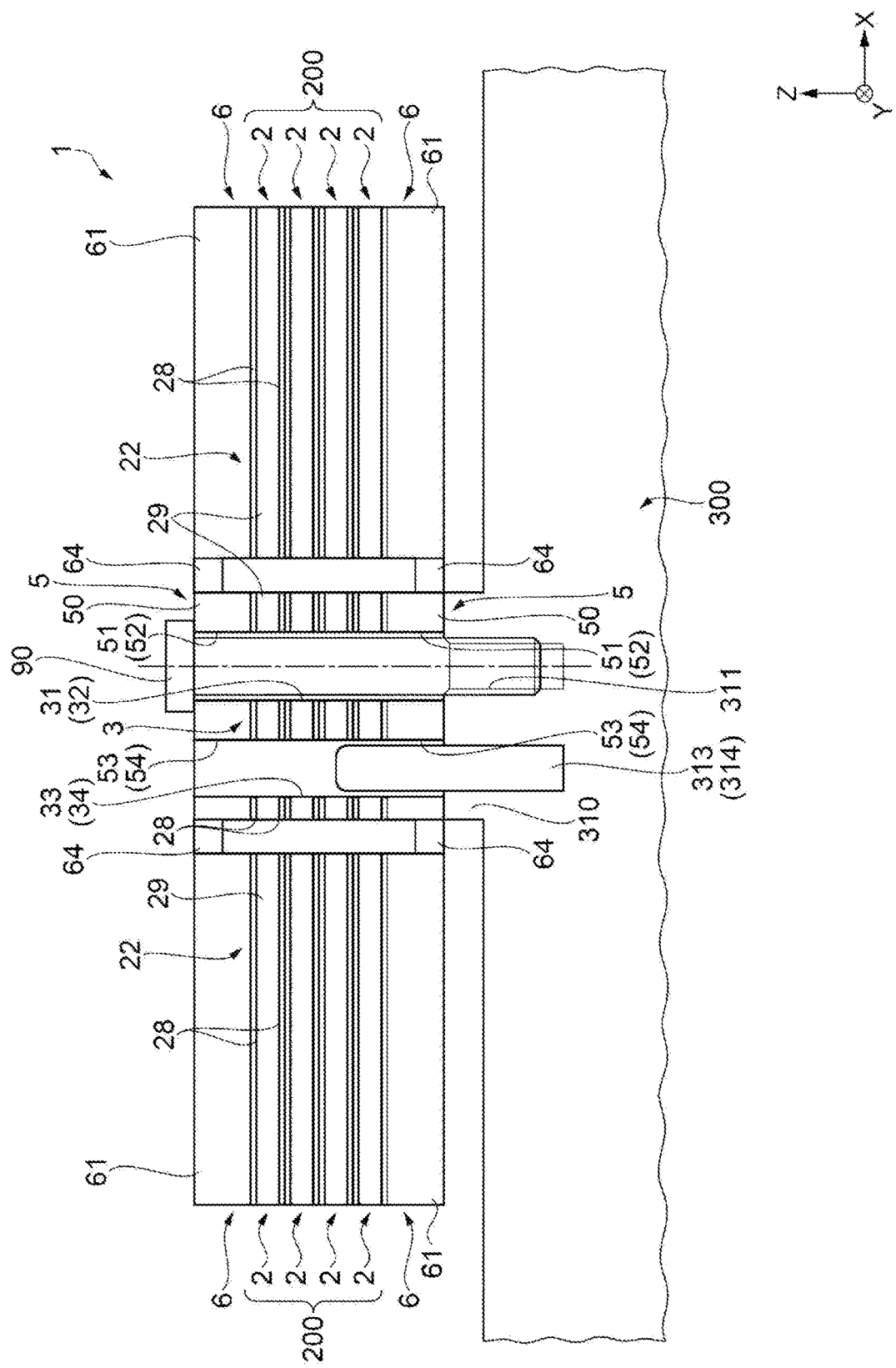
FIG. 3 is a sectional view along line A-A in FIG. 1.
Figure 4:
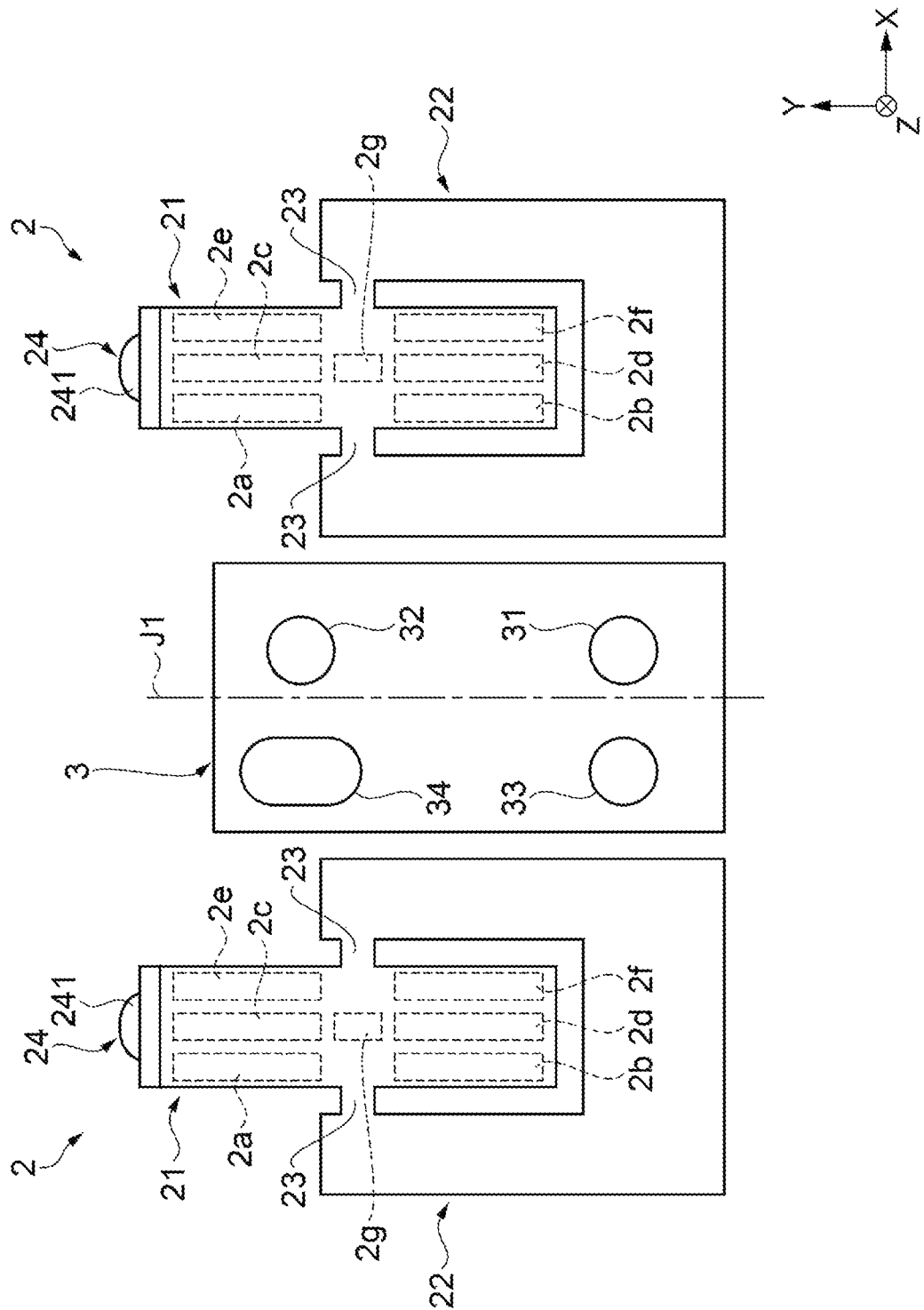
FIG. 4 is a plan view showing vibrators of the piezoelectric drive device.
Figure 5:
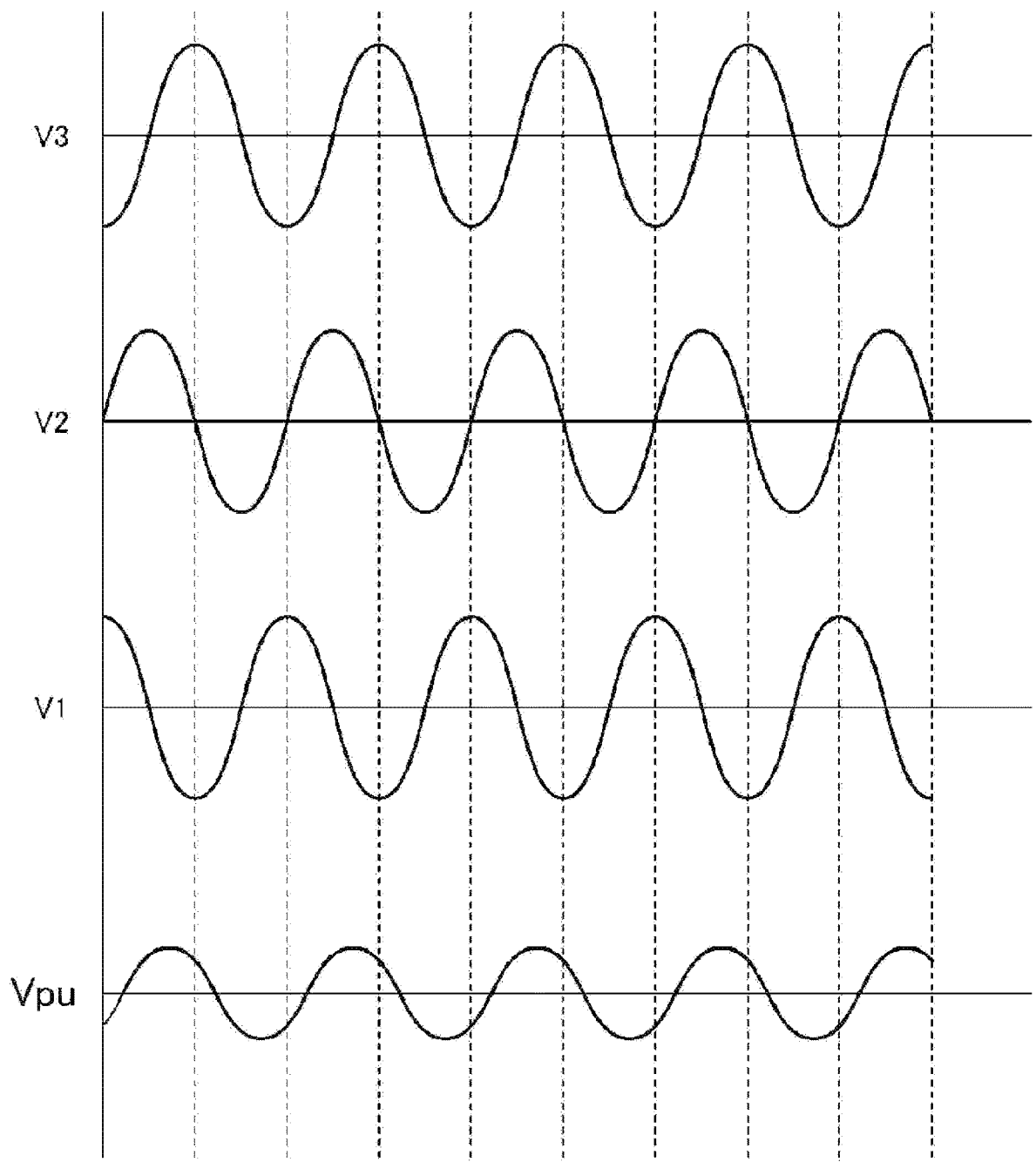
FIG. 5 shows drive signals applied to the vibrator.

FIG. 1 is a plan view showing a piezoelectric drive device 1 and a piezoelectric motor 10 according to a first embodiment. FIG. 2 is a side view showing the piezoelectric drive device 1 as seen from a transmitting portion 24 side. Note that, in FIG. 2, for explanation of a configuration of a vibrating portion 21, one of the transmitting portions 24 is not shown. FIG. 3 is a sectional view along line A-A in FIG. 1. FIG. 4 is a plan view showing vibrators 2 of the piezoelectric drive device 1. FIG. 5 shows drive signals applied to the vibrator 2.

In the following respective drawings, for convenience of explanation, dimensions of the respective parts are appropriately exaggerated as necessary and the dimensions of the respective parts are not necessarily the same as the real dimensions.

Hereinafter, for convenience of explanation, the front side in the paper surface in FIG. 1 is also referred to as "upper" or "upside" and the deep side in the paper surface in FIG. 1 is also referred to as "lower" or "downside". Further, a slider 100 side of the vibrator 2 is also referred to as "distal end side" and the opposite side to the slider 100 is also referred to as "proximal end side". Furthermore, three axes orthogonal to one another are an X-axis, a Y-axis, and a Z-axis, directions along the X-axis are also referred to as "X-axis directions", directions along the Y-axis are also referred to as "Y-axis directions", and directions along the Z-axis are also referred to as "Z-axis directions".

In the embodiment, the X-axis directions are directions in which the slider 100 as a driven member moves (movement directions) or directions in which the slider 100 as the driven member is driven (drive directions). The +X-axis direction is a rightward direction in the paper surface in FIG. 1. The −X-axis direction is the opposite direction to the +X-axis direction and a leftward direction in the paper surface in FIG. 1. In the embodiment, the Y-axis directions are directions toward the distal end side and the proximal end side. The +Y-direction is toward the distal end side. The −Y-axis direction is the opposite direction to the +Y-axis direction and toward the proximal end side. In the embodiment, the Z-axis directions are upward and downward directions, thickness directions. The +Z-axis direction is toward the front side in the paper surface in FIG. 1 (upward direction). The −Z-axis direction is the opposite direction to the +Z-axis direction and toward the deep side in the paper surface in FIG. 1 (downward direction).

As shown in FIG. 1, the piezoelectric motor 10 has the slider 100 as the driven member that can linearly move in the X-axis directions, the piezoelectric drive device 1 in contact with a side surface 101 of the slider 100, and a controller (not shown) controlling driving of the piezoelectric drive device 1. The piezoelectric motor 10 drives the piezoelectric drive device 1 under control by the controller, and a drive force generated in the piezoelectric drive device 1 is transmitted to the slider 100 and the slider 100 linearly moves in the X-axis directions.

The configuration of the piezoelectric motor 10 is not particularly limited. For example, a plurality of the piezoelectric drive devices 1 shown in FIG. 1 may be placed along the directions in which the slider 100 extends and the slider 100 may be moved by driving of the plurality of the piezoelectric drive devices 1. Or, the piezoelectric drive device 1 may contact a top surface 102 of the slider 100, not the side surface 101 of the slider 100.

The driven member is not limited to one that linearly moves like the slider 100, but may be e.g. a rotor rotatable around a rotation axis or the like. When the driven member is a rotor, the piezoelectric drive device 1 is located at the curved side surface side of the rotor and brought into contact on the top surface as a planar surface of the rotor, and thereby, the rotor can be rotated around a rotation axis.

As shown in FIG. 1, the piezoelectric drive device 1 has two vibrators 2 placed adjoiningly along the X-axis directions as drive directions, which will be described later, and pairs of urging portions 6 placed with the two vibrators 2 in between in the Z-axis directions as thickness directions. Note that the vibrator 2 is also referred to as the so-called piezoelectric actuator.

As shown in FIGS. 1 to 3, the piezoelectric drive device 1 has fixing portions 5 fixing the two vibrators 2 and the pairs of urging portions 6 to a stage 300 as a fixed portion. Further, the fixing portions 5 have through holes (first through holes 51 and second through holes 52) placed between the two vibrators 2, into which pins or screws are inserted for fixation to the fixed portion, and fix the two vibrators 2.

The details will be described later. As shown in FIGS. 2 and 3, the two vibrators 2 arranged in the X-axis directions are stacked in a plurality of layers in the Z-axis directions. The urging portions 6 are placed with a layered structure 200 formed by stacking of the plurality of vibrators 2 in between.

In other words, the layered structure 200 is formed by stacking of the plurality of vibrators 2 in perpendicular directions (Z-axis directions) to the drive directions (X-axis directions) of the slider 100. Accordingly, the layered structure 200 and the urging portions 6 overlap in the perpendicular directions to the drive directions of the slider 100. Note that the vibrators 2 are stacked to form the layered structure 200, and thereby, the drive force is increased compared to the piezoelectric drive device 1 formed by single-layered vibrators 2.

As shown in FIGS. 1 and 4, each of the two vibrators 2 has a vibrating portion 21, a supporting portion 22 supporting the vibrating portion 21, coupling portions 23 coupling the vibrating portion 21 and the supporting portion 22, and a transmitting portion 24 fixed to the distal end of the vibrating portion 21 and transmitting the vibration of the vibrating portion 21 to the slider 100. Further, the two vibrators 2 have a single auxiliary fixing portion 3 extending in the Y-axis directions.

The auxiliary fixing portion 3 is placed between the two vibrators 2 in the X-axis directions. The two vibrators 2 are formed in outer shapes symmetrical with respect to the YZ-plane passing through a center line J1 of the auxiliary fixing portion 3 in the X-axis directions. The center line J1 may be regarded as a symmetry axis of the vibrators 2.

The two vibrators 2 have the same configuration as each other and, as below, for convenience of explanation, the vibrator 2 in the +X-axis direction will be representatively explained and only parts of the vibrator 2 in the −X-axis direction different from those of the vibrator 2 in the +X-axis direction will be explained.

As shown in FIG. 4, the vibrating portion 21 is formed in a plate shape spreading in the XY-plane containing the X-axis and the Y-axis in thickness directions along the Z-axis directions. Further, the vibrating portion 21 is formed in a rectangular shape shorter in the X-axis directions and longer in the Y-axis directions in a plan view from the +Z-axis direction. The vibrating portion 21 flexurally vibrates in S-shapes by bending in the X-axis directions while expanding and contracting in the Y-axis directions. Note that the shape of the vibrating portion 21 is not particularly limited as long as the portion may fulfill the function thereof.

As shown in FIG. 4, the vibrating portion 21 has drive piezoelectric elements 2a to 2f that flexurally vibrate the vibrating portion 21 and a detection piezoelectric element 2g that detects the vibration of the vibrating portion 21. The piezoelectric elements 2c, 2d are placed adjoiningly in the Y-axis directions in the center part of the vibrating portion 21 in the X-axis directions. Further, the piezoelectric elements 2a, 2b are placed adjoiningly in the Y-axis directions in the −X-axis direction of the piezoelectric elements 2c, 2d, and the piezoelectric elements 2e, 2f are placed adjoiningly in the Y-axis directions in the +X-axis direction. These piezoelectric elements 2a to 2f respectively expand and contract in the Y-axis directions by energization. Note that the number and the placement of the drive piezoelectric elements are not particularly limited as long as the elements may flexurally vibrate the vibrating portion 21.

The piezoelectric element 2g is placed between the piezoelectric elements 2c, 2d. The piezoelectric element 2g is subjected to an external force according to the flexural vibration of the vibrating portion 21 and outputs a detection signal according to the applied external force. Accordingly, the piezoelectric drive device 1 may sense the vibration state of the vibrating portion 21 based on the detection signal output from the piezoelectric element 2g. Note that the number and the placement of the detection piezoelectric element are not particularly limited as long as the element may detect the vibration of the vibrating portion 21. Alternatively, the detection piezoelectric element may be omitted.

As shown in FIG. 2, the vibrating portion 21 includes a piezoelectric element layer 27 having the piezoelectric elements 2a to 2g and a pair of substrates 28 sandwiching the piezoelectric element layer 27. The respective substrates 28 are e.g. silicon substrates. Each of the piezoelectric elements 2a to 2f is formed by sandwiching of a piezoelectric material by a pair of electrodes. Here, the piezoelectric materials and the electrodes are not shown.

The constituent material of the piezoelectric material is not particularly limited, but piezoelectric ceramics including e.g. lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, and lead scandium niobate may be used. As the piezoelectric material, not only the above described piezoelectric ceramics but also polyvinylidene fluoride, quartz crystal, or the like may be used.

The method of forming the piezoelectric material is not particularly limited, but the material may be formed from a bulk material or using the sol-gel method or sputtering method. In the embodiment, the piezoelectric material is formed using the sol-gel method. Thereby, the piezoelectric material thinner than that formed from the bulk material, for example, may be obtained and the vibrator 2 may be made thinner.

As shown in FIGS. 1 and 2, when the plurality of vibrators 2 are stacked to form the layered structure 200, the transmitting portion 24 is placed in the end portion at the distal end side in the +Y-axis direction (distal end portion) of the stacked vibrating portions 21. The transmitting portion 24 is formed to have a distal end part 241. The distal end part 241 is formed to curve and project in a convex shape from the vibrating portions 21 in the +Y-axis direction and extend in the Z-axis directions.

When the piezoelectric drive device 1 is fixed to the stage 300 (FIGS. 3, 4) as the fixed portion of a robot 500 (FIG. 10), which will be described later, the distal end part 241 is brought into contact with the side surface 101 of the slider 100 and pressed against the side surface 101 by the urging portions 6. Accordingly, the vibration of the vibrating portions 21 is transmitted to the slider 100 via the transmitting portion 24. The constituent material of the transmitting portion 24 is not particularly limited to, but includes various ceramics e.g. zirconia, alumina, and titania. The transmitting portion 24 is formed using these materials, and thereby, the transmitting portion 24 with higher durability is obtained.

As shown in FIGS. 1 and 4, the supporting portion 22 has a function of supporting the vibrating portion 21. The supporting portion 22 is formed in a U-shape surrounding both sides in the X-axis directions and the proximal end side of the vibrating portion 21 in the plan view from the +Z-axis direction. Note that the configuration of the supporting portion 22 is not particularly limited as long as the portion may fulfill the function thereof.

Further, as shown in FIG. 4, the coupling portions 23 are portions as a node of flexural vibration of the vibrating portion 21. Specifically, the coupling portions 23 couples the center part in the Y-axis directions of the vibrating portion 21 and the supporting portion 22. The coupling portions 23 are located in the +X-axis direction and the −X-axis direction of the vibrating portion 21 and couples the vibrating portion 21 and the supporting portion 22.

Note that the configuration of the coupling portion 23 is not particularly limited as long as the portion may fulfill the function thereof. For example, each of the coupling portion 23 of the embodiment is formed by a single beam, but may be formed by a plurality of beams.

As shown in FIGS. 1 to 4, the auxiliary fixing portion 3 is a portion fixing the two vibrators 2 (two layered structures 200 in the embodiment) and the pairs of urging portions 6 to the stage 300 as the fixed portion to assist the fixing portions 5. The auxiliary fixing portion 3 is provided to correspond to the fixing portions 5 of the pairs of urging portions 6, formed to have an equal thickness as the thickness of the vibrators 2 (layered structure 200), placed between the pair of fixing portions 5, and has a function of assisting fixation to the stage 300 by the fixing portions 5.

As shown in FIGS. 1 to 4, the auxiliary fixing portion 3 has a first auxiliary through hole 31 to correspond tithe first through holes 51 of the fixing portions 5, which will be described later in the same inner diameter. The auxiliary fixing portion 3 has a second auxiliary through hole 32 to correspond tithe second through holes 52 of the fixing portions 5 in the same inner diameter. Further, the auxiliary fixing portion 3 has a first auxiliary reference hole 33 to correspond to first reference holes 53 of the fixing portions 5 in the same inner diameter. The auxiliary fixing portion 3 has a second auxiliary reference hole 34 to correspond to second reference holes 54 of the fixing portions 5 in the same shape.

As shown in FIG. 4, the auxiliary fixing portion 3 is placed between the two vibrators 2 in the X-axis directions. The auxiliary fixing portion 3 has the first auxiliary through hole 31 at the proximal end side and has the second auxiliary through hole 32 at the distal end side in the +X-axis direction of the center axis J1. Further, the auxiliary fixing portion 3 has the first auxiliary reference hole 33 at the proximal end side and has the second auxiliary reference hole 34 at the distal end side in the −X-axis direction of the center axis J1.

As shown in FIGS. 2, 3, the supporting portion 22 and the coupling portions 23 of the vibrator 2 and the auxiliary fixing portion 3 are formed by an interlayer portion 29 and the pair of substrates 28 sandwiching the interlayer portion 29. The interlayer portion 29 is located between the pair of substrates 28 and joined to the substrates 28 via insulating adhesives (not shown) placed between the substrates 28 and itself. Further, the interlayer portion 29 has substantially the same shape and size as the substrates 28 in the plan view from the +Z-axis direction. Furthermore, the interlayer portion 29 has an insulation property.

The constituent material of the interlayer portion 29 is not particularly limited, but various ceramics e.g. zirconia, alumina, and titania, various metal materials, silicon, various resin materials, etc. may be used. Of the materials, various ceramics, various metal materials, and silicon are preferably used. Thereby, the hard interlayer portion 29 may be obtained. Note that, when a metal material is used, in order to provide an insulation property to the interlayer portion 29, for example, processing for insulating treatment on the surface or the like is necessary. The silicon is used, and thereby, the interlayer portion 29 may be placed using the silicon wafer process, and the vibrators 2 may be efficiently manufactured. The piezoelectric element layer 27 and the interlayer portion 29 are formed to have substantially the same thickness.

The controller includes a computer having a processor processing information, a memory communicably coupled to the processor, and an external interface. Further, a program that can be executed by the processor is stored in the memory, and the processor reads and executes the program stored in the memory. The controller receives a command from a host computer (not shown) and drives the vibrators 2 based on the command.

For example, when a drive signal V1 shown in FIG. 5 is applied to the piezoelectric elements 2a, 2f, a drive signal V2 is applied to the piezoelectric elements 2c, 2d, and a drive signal V3 is applied to the piezoelectric elements 2b, 2e, the vibrating portion 21 stretchingly vibrates (not shown) in the Y-axis directions and flexurally vibrates (not shown) in inverted S-shapes in the X-axis directions. The stretching vibration in the Y-axis directions and the flexural vibration in the X-axis directions are synthesized, and the distal end part 241 of the transmitting portion 24 makes an elliptic motion to describe an elliptic trajectory (not shown) counterclockwise. Thereby, the slider 100 is pushed out and the slider 100 moves in the −X-axis direction. Further, a detection signal Vpu according to the stretching vibration in the Y-axis directions contained in the flexural vibration of the vibrating portion 21 is output from the piezoelectric element 2g.

When the waveforms of the drive signals V1, V3 are switched, the vibrating portion 21 stretchingly vibrates (not shown) in the Y-axis directions and flexurally vibrates (not shown) in S-shapes in the X-axis directions. The stretching vibration in the Y-axis directions and the flexural vibration in the X-axis directions are synthesized, and the distal end part 241 of the transmitting portion 24 makes an elliptic motion to describe an elliptic trajectory (not shown) clockwise. Thereby, the slider 100 is pushed out and the slider 100 moves in the +X-axis direction. Further, a detection signal Vpu according to the stretching vibration in the Y-axis directions contained in the flexural vibration of the vibrating portion 21 is output from the piezoelectric element 2g.

Note that, as described above, the vibrator 2 in the −X-axis direction is formed symmetrically with respect to the YZ-plane passing through the center line J1. The difference from the vibrator 2 in the +X-axis direction is that, as shown in FIG. 4, the piezoelectric elements 2a to 2g formed in the vibrating portion 21 are formed in the same orientations as the piezoelectric elements 2a to 2g in the vibrator 2 in the +X-axis direction. In other words, the placement of the piezoelectric elements 2a to 2f to which the drive signals V1 to V3 are applied is the same in the two vibrators 2.

Specifically, in the vibrating portion 21 in the −X-axis direction, the piezoelectric elements 2c, 2d are placed adjoiningly in the Y-axis directions in the center part of the vibrating portion 21 in the X-axis directions. Further, the piezoelectric elements 2a, 2b are placed adjoiningly in the Y-axis directions in the −X-axis direction of the piezoelectric elements 2c, 2d, and the piezoelectric elements 2e, 2f are placed adjoiningly in the Y-axis directions in the +X-axis direction. The piezoelectric elements 2a to 2g are placed as described above, and thereby, the directions of the flexural vibrations in the vibrating portions 21 of the two vibrators 2 are the same.

As shown in FIGS. 1 and 4, the two vibrators 2 of the embodiment are formed in the X-axis directions in the plan view from the +Z-axis direction. Further, as shown in FIGS. 2 and 3, with the two vibrators 2 as a single layer, a plurality of the layers are stacked in the Z-axis directions as the thickness directions in the same orientation to form the layered structures 200. As described above, the auxiliary fixing portion 3 is formed in the same manner as the supporting portion 22 and the coupling portions 23, and thereby, formed as a part of the vibrators 2 and a part of the layered structures 200.

Note that the vibrators 2 have the configuration including the auxiliary fixing portion 3 in which the upside and the downside of the piezoelectric element layer 27 and the interlayer portion 29 are sandwiched by the substrates 28. Further, the vibrators 2 stacked in the Z-axis directions are joined by e.g. insulating adhesives (not shown). The pair of urging portions 6 are joined to sandwich the layered structure 200 formed by stacking of the plurality of vibrators 2 by insulating adhesives (not shown).

In the embodiment, in the vibrators 2 stacked in the Z-axis directions, the substrate 28 of one vibrator 2 is placed to be superimposed on the substrate 28 of the other vibrator 2. However, in the stacked vibrators 2, for example, the substrate 28 of one vibrator 2 and the substrate 28 of the other vibrator 2 may be formed by a single substrate. That is, the substrate 28 of one vibrator 2 may also serve as the substrate 28 of the other vibrator 2.

As explained using FIG. 1, the pair of urging portions 6 sandwich the layered structure 200 in which the vibrators 2 are stacked from both sides in the Z-axis directions. That is, as shown in FIGS. 1 to 3, one urging portion 6 is placed in the +Z-axis direction of the layered structure 200, and the other urging portion 6 is placed in the −Z-axis direction. The urging portions 6 are placed as described above, and thereby, the layered structure 200 may be urged from both sides in the thickness directions with balance. Accordingly, fluctuations in position of the layered structure 200, particularly, inclinations in the Z-axis directions are suppressed, and the drive force generated in the layered structure 200 may be efficiently transmitted to the slider 100. Therefore, the piezoelectric drive device 1 having higher drive efficiency may be obtained. Note that the placement is not limited to that, but one of the urging portions 6 may be omitted.

The pair of urging portions 6 in the Z-axis directions have the same configuration as each other. As below, for convenience of explanation, the urging portion 6 located in the +Z-axis direction will be representatively explained and the explanation of the urging portion 6 located in the −Z-axis direction will be omitted.

The urging portion 6 has a plate-like shape and a function of pressing the transmitting portion 24 against the side surface 101 of the slider 100 as the driven member by urging the layered structure 200 toward the slider 100. Note that, as below, the layered structure 200 will be replaced by the vibrator 2 for explanation.

The urging portion 6 is joined to the upper surface of the vibrator 2 via a joining member such as an insulating adhesive (not shown). The urging portion 6 has a holding part 61 holding the vibrator 2, and a pair of spring parts 63, 64 urging the vibrator 2 toward the slider 100.

As explained using FIGS. 1 to 3, the piezoelectric drive device 1 has the fixing portions 5 fixing the two vibrators 2 and the pairs of urging portions 6 to the stage 300 as the fixed portion. The fixing portions 5 in the embodiment are formed integrally with the urging portions 6. Specifically, the fixing portions 5 are coupled to the holding parts 61 of the urging portions 6 by the pairs of spring parts 63, 64 of the urging portions 6. In other words, the urging portions 6 have the pairs of spring parts 63, 64 coupling the holding parts 6l and the fixing portions 5.

The urging portions 6 and the fixing portions 5 are formed symmetrically with respect to the YZ-plane passing through the center line J1 in the X-axis directions. The urging portions 6 are formed to have the two holding parts 61 and the two pairs of spring parts 63, 64 in the X-axis directions with the fixing portions 5 at the center (the center line J1 at the center). Thereby, the urging portions 6 cover the upper surfaces of the vibrators 2 in correspondence with the two vibrators 2 formed in the X-axis directions. As described above, the fixing portions 5 are placed between the two vibrators 2 in the plan view from the +Z-axis direction as the stacking direction.

As shown in FIGS. 1 to 3, the fixing portion 5 has a fixing portion main body 50 in a plate-like rectangular shape. The fixing portion main body 50 has the first through hole 51 at the proximal end side and the second through hole 52 at the distal end side in the +X-axis direction of the center line J1. When the fixing portion 5 is fixed to the stage 300, fixing screws 90 are inserted into the first through hole 51 and the second through hole 52. The first through hole 51 and the second through hole 52 of the embodiment are formed to have the same hole diameter.

Further, the fixing portion main body 50 has the first reference hole 53 at the proximal end side and the second reference hole 54 at the distal end side in the −X-axis direction of the center line J1. The first reference hole 53 and the second reference hole 54 are used for position adjustment of the piezoelectric drive device 1 when the fixing portion 5 (piezoelectric drive device 1) is fixed to the stage 300. The second reference hole 54 is used for angle adjustment of the piezoelectric drive device 1 with reference to the first reference hole 53.

As shown in FIGS. 1 and 3, reference pins 313, 314 placed in the stage 300 are inserted into the first reference hole 53 and the second reference hole 54, respectively. The first reference hole 53 of the embodiment is formed in a circular shape and the second reference hole 54 is formed as a hole in a slot shape.

The urging portions 6 (holding parts 61 and spring parts 63, 64) and the fixing portions 5 (fixing portion main bodies 50) are integrally formed. The holding parts 61, the spring parts 63, 64, and the fixing portion main bodies 50 may be integrally formed from e.g. a silicon substrate. Thereby, the urging portions 6 and the fixing portions 5 having sufficient mechanical strength and elasticity may be obtained.

The silicon wafer process may be used for manufacture of the urging portions 6 and the fixing portions 5, and the urging portions 6 and the fixing portions 5 may be manufactured with higher processing accuracy. The urging portions 6 and the fixing portions 5 are formed from the silicon substrate, and thereby, the difference in coefficient of thermal expansion from the vibrator 2 may be reduced, generation of thermal stress may be reduced, and bending, distortion, etc. of the vibrator 2 may be suppressed. The constituent materials of the urging portions 6 and the fixing portions 5 are not particularly limited, but e.g. various resin materials, various metal materials, various glass materials, various ceramic materials, etc. may be used.

The fixing portion 5 (fixing portion main body 50) is sandwiched by the two holding parts 61 in the X-axis directions and placed on the outer surface of the auxiliary fixing portion 3 formed integrally with the vibrators 2 in the Z-axis directions. As shown in FIG. 3, the fixing portion 5 (fixing portion main body 50) is the portion for fixing the piezoelectric drive device 1 to the stage 300 of a robot or the like. Specifically, the fixing portions 5 sandwich the auxiliary fixing portion 3 in the Z-axis directions and are fixed to the stage 300 by the screws 90.

As shown in FIGS. 1 to 3, the holding part 61 is joined to the outer surface of the supporting portion 22 of the vibrator 2. As shown in FIG. 2, a concave portion 611 opening toward inside is formed in a portion of the holding part 61 overlapping with the vibrating portion 21. By the concave portion 611, a gap is formed between the holding part 61 and the vibrating portion 21. Thereby, the contact between the holding part 61 and the vibrating portion 21 is suppressed. Accordingly, the vibration of the vibrating portion 21 is not hindered and the piezoelectric drive device 1 may be driven more stably.

The spring parts 63, 64 are placed between the holding part 61 and the fixing portion 5 (fixing portion main body 50) in the plan view from the +Z-axis direction. Further, the spring parts 63, 64 are placed adjoiningly in the Y-axis directions as the urging direction of the vibrator 2. The spring parts 63, 64 are placed adjoiningly in the Y-axis directions, and thereby, the vibrator 2 may be urged toward the slider 100 more stably with a stronger urging force.

Each of the spring parts 63, 64 has a plurality of springs 65 arranged at equal pitches in the Y-axis directions. One ends as ends in the −X-axis direction of the springs 65 of the spring parts 63, 64 in the +X-axis direction are coupled to the fixing portion 5 (fixing portion main body 50) and the other ends as ends in the +X-axis direction are coupled to the holding part 61. Further, one ends as ends in the +X-axis direction of the springs 65 of the spring parts 63, 64 in the −X-axis direction are coupled to the fixing portion 5 (fixing portion main body 50) and the other ends as ends in the −X-axis direction are coupled to the holding part 61.

The piezoelectric drive device 1 is fixed to the stage 300 with the plurality of springs 65 elastically deformed in the +Y-axis direction, and thereby, the vibrator 2 is urged in the +Y-axis direction and the transmitting portion 24 is pressed against the side surface 101 of the slider 100.

The piezoelectric drive device 1 of the embodiment does not have a case housing the piezoelectric drive device 1 or the like. Therefore, downsizing may be realized compared to a piezoelectric drive device of related art. Thereby, when the piezoelectric drive device 1 is manufactured, the number of parts taken from a predetermined wafer may be increased. Further, in the embodiment, doubling to form two vibrators 2 on the XY-plane is performed. Note that, not only doubling but also tripling or multiplication may be performed. Thereby, the number of taken parts may be further increased.

As shown in FIGS. 1 to 3, in the piezoelectric drive device 1, the urging portion 6 (containing the fixing portion 5), the vibrator 2 (containing the auxiliary fixing portion 3), and the urging portion 6 (containing the fixing portion 5) are sequentially stacked toward the +Z-axis direction. Therefore, the fixing portion 5 and the auxiliary fixing portion 3 are formed to be superimposed in the Z-axis directions as the stacking directions.

In the fixing portion 5 and the auxiliary fixing portion 3, the first through hole 51 of the fixing portion 5 and the first auxiliary through hole 31 of the auxiliary fixing portion 3 are formed to be coupled in the Z-axis directions in substantially the same positions as through holes having the same inner diameter. Similarly, the second through hole 52 of the fixing portion 5 and the second auxiliary through hole 32 of the auxiliary fixing portion 3 are formed to be connected in the Z-axis directions in substantially the same positions as through holes having the same inner diameter.

Further, the first reference hole 53 of the fixing portion 5 and the first auxiliary reference hole 33 of the auxiliary fixing portion 3 are formed to be connected in the Z-axis directions in substantially the same positions as through holes having the same inner diameter. The second reference hole 54 of the fixing portion 5 and the second auxiliary reference hole 34 of the auxiliary fixing portion 3 are formed to be connected in the Z-axis directions in substantially the same positions as through holes having substantially the same shape.

As shown in FIGS. 2 and 3, the stage 300 of the robot as the fixed portion of the embodiment has a coupling and fixing portion 310 projecting in the +Z-axis direction and extending in the Y-axis directions to correspond to the fixing portion main body 50 of the fixing portion 5 formed integrally with the urging portion 6. The coupling and fixing portion 310 is a portion having an upper surface to which the piezoelectric drive device 1 is fixed. Specifically, the two fixing portions 5 forming the piezoelectric drive device 1 and the auxiliary fixing portion 3 sandwiched by the two fixing portions 5 are fixed to the upper surface of the coupling and fixing portion 310.

Screw holes 311 for screwing and fixing the screws 90 are respectively formed in the coupling and fixing portion 310 to correspond to the first through hole 51 and the second through hole 52 of the fixing portion 5. Further, in the coupling and fixing portion 310, a reference pin 313 is placed to project from the upper surface in the +Z-axis direction to correspond to the first reference hole 53 of the fixing portion 5. Similarly, in the coupling and fixing portion 310, a reference pin 314 is placed to project from the upper surface in the +Z-axis direction to correspond to the second reference hole 54 of the fixing portion 5. The two reference pins 313, 314 are formed in cylindrical shapes having the same outer diameter.

The procedure to fix the piezoelectric drive device 1 to the stage 300 is explained.

First, the lower fixing portion 5 of the piezoelectric drive device 1 is mounted on the upper surface of the coupling and fixing portion 310 of the stage 300 so that the reference pin 313 may be inserted into the first reference hole 53 of the fixing portion 5 of the piezoelectric drive device 1 and the reference pin 314 may be inserted into the second reference hole 54.

Then, with reference to the reference pin 313, using the gap between the first reference hole 53 and the reference pin 313 and the gap between the second reference hole 54 and the reference pin 314, movement of the piezoelectric drive device 1 in the Y-axis directions and rotation (angle adjustment) of the piezoelectric drive device 1 in the X-axis directions are performed, and position adjustment of the piezoelectric drive device 1 with respect to the slider 100 is performed. By the position adjustment, the transmitting portion 24 coupling to the vibrating portion 21 of the piezoelectric drive device 1 may press the side surface 101 of the slider 100 in a proper direction (e.g. the perpendicular direction) with a proper pressing force.

Note that, after the position adjustment is finished, the screws 90 are inserted into the first through hole 51 and the second through hole 52 of the fixing portion 5 from upside and respectively screwed into the screw holes 311 of the coupling and fixing portion 310, and thereby, as shown in FIGS. 1 and 3, the piezoelectric drive device 1 is fixed to the stage 300.

In the embodiment, the multilayer structure in which four vibrators 2 are stacked is used as a multilayered structure, however, a single-layer structure may be employed. Further, the number of stacked vibrators 2 may be appropriately set. Note that the vibrators 2 are stacked, and thereby, a higher drive force may be obtained compared to the single-layer structure. In the embodiment, the two through holes (first through hole 51 and second through hole 52) are provided in the fixing portion 5, however, a single through hole may be provided.

The auxiliary fixing portion 3 of the embodiment is formed integrally with the vibrators 2. However, the auxiliary fixing portion 3 may have the equal thickness as the thickness of the stacked vibrators 2 to fill the gap between the upper and lower fixing portions 5. Therefore, the auxiliary fixing portion 3 is not limited to the multilayer structure of the interlayer portions 29 and the substrates 28, but may be formed by stacking of a plurality of silicon substrates or integrally formed using various hard resin materials, various metal materials, etc.

According to the embodiment, the following effects may be obtained.

The piezoelectric drive device 1 of the embodiment includes the two vibrators 2 and the fixing portion 5. Each of the two vibrators 2 has the vibrating portion 21 with the piezoelectric elements 2a to 2f, and the transmitting portion 24 placed in the vibrating portion 21 and transmitting the drive force to the slider 100 as the driven member. Further, the two vibrators 2 are provided adjoiningly along the drive directions (X-axis directions) of the slider 100. Further, the fixing portions 5 is placed between the two vibrators 2 and fixes the two vibrators 2.

According to the configuration, the piezoelectric drive device 1 may be downsized compared to a case where the individual vibrators 2 are fixed by different fixing portions 5. Further, in the position adjustment of the piezoelectric drive device 1 with respect to the slider 100 as the driven member, the position adjustment of the two vibrators 2 may be performed at a time and the position adjustment becomes easier.

The piezoelectric drive device 1 of the embodiment has the plate-like urging portions 6 urging the two vibrators 2 toward the slider 100. The urging portions 6 and the two vibrators 2 are superimposed in the perpendicular directions to the drive directions (X-axis directions).

According to the configuration, the urging portions 6 and the vibrators 2 may be formed using the silicon wafer process or the like, and thereby, the piezoelectric drive device 1 may be downsized. Further, the manufacture of the piezoelectric drive device 1 becomes easier.

In the piezoelectric drive device 1 of the embodiment, the urging portion 6 and the fixing portion 5 are integrally formed.

According to the configuration, the fixing portion 5 may be formed integrally with the urging portion 6 using the silicon wafer process or the like, and thereby, the piezoelectric drive device 1 may be downsized. Further, the manufacture of the piezoelectric drive device 1 becomes easier.

2. Second Embodiment

Figure 6:
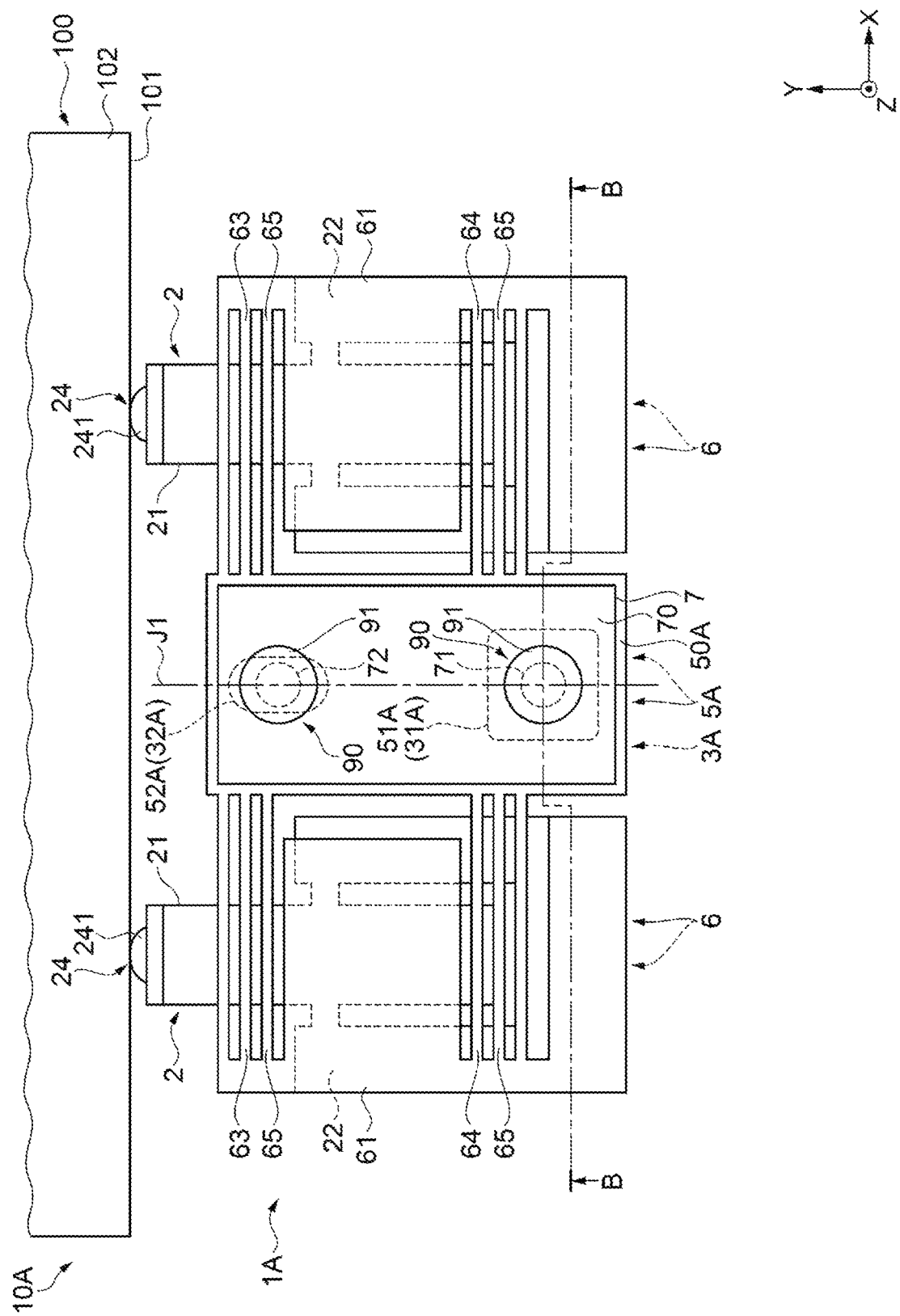
FIG. 6 is a plan view showing a piezoelectric drive device according to a second embodiment.
Figure 7:
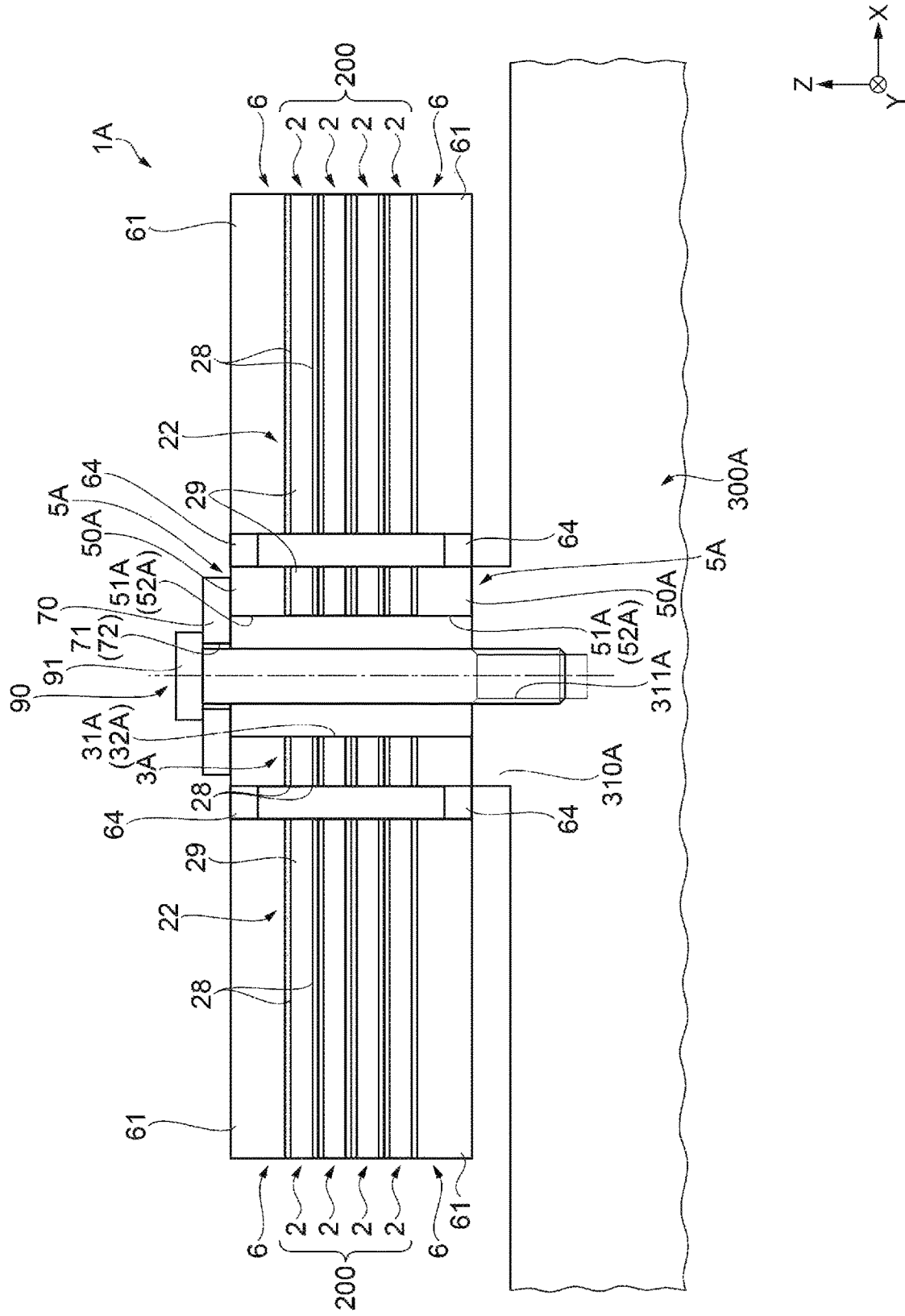
FIG. 7 is a sectional view along line B-B in FIG. 6.

FIG. 6 is a plan view showing a piezoelectric drive device 1A according to a second embodiment. FIG. 7 is a sectional view along line B-B in FIG. 6.

A piezoelectric motor 10A of the embodiment is different from the piezoelectric motor 10 of the first embodiment in the configuration of the piezoelectric drive device 1A. The piezoelectric drive device 1A is different from the piezoelectric drive device 1 of the first embodiment in configurations of a fixing portion 5A and an auxiliary fixing portion 3A. The piezoelectric drive device 1A is largely different in that a spacer 7 is provided.

The other configurations are the same as those of the first embodiment. The following description will explain with a focus on the differences from the first embodiment and the explanation of the same configurations will be omitted. In FIGS. 6 and 7, the same configurations as those of the first embodiment have the same signs.

As shown in FIGS. 6 and 7, the fixing portion 5A of the embodiment has a fixing portion main body 50A formed to have the same outer shape as the fixing portion main body 50 of the first embodiment. Further, the fixing portion main body 50A has a first through hole 51A as a through hole substantially in a rectangular shape and a second through hole 52A as a through hole in a slot shape on the center line J1. The first through hole 51A is formed to have a larger diameter than the outer diameter of a head portion 91 of the screw 90. Further, the shape of the second through hole 52A is the slot shape and the width of the linear portion is formed to be smaller than the outer diameter of the head portion 91 of the screw 90. Note that the first through hole 51A may have a circular shape.

Accordingly, it is hard to fix the fixing portion 5A to a stage 300A, which will be described later, by inserting the screw 90 into the first through hole 51A. Further, it is hard to fix the fixing portion 5A to the stage 300A to be described later by inserting the screw 90 into the second through hole 52A.

The auxiliary fixing portion 3A of the embodiment is formed to have the same outer shape as the auxiliary fixing portion 3 of the first embodiment. The auxiliary fixing portion 3A has a first auxiliary through hole 31A to correspond to the first through hole 51A of the fixing portion 5A in the same shape. Further, the auxiliary fixing portion 3A has a second auxiliary through hole 32A to correspond to the second through hole 52A of the fixing portion 5A in the same shape.

The first through hole 51A of the fixing portion 5A and the first auxiliary through hole 31A of the auxiliary fixing portion 3A are formed to be coupled in the Z-axis directions in substantially the same positions. Similarly, the second through hole 52A of the fixing portion 5A and the second auxiliary through hole 32A of the auxiliary fixing portion 3A are formed to be coupled in the Z-axis directions in substantially the same positions.

The spacer 7 of the embodiment is formed to have a spacer main body 70 in a rectangular shape slightly smaller than the outer shape of the fixing portion main body 50A of the fixing portion 5. The spacer 7 of the embodiment is placed between the upper fixing portion 5A and the head portion 91 of the screw 90 fixing the fixing portion 5A in the Z-axis directions.

The spacer main body 70 has a first through hole 71 having an inner diameter smaller than the outer diameter of the head portion 91 of the screw 90 to correspond to substantially the center position of the first through hole 51A of the fixing portion 5A. Further, the spacer main body 70 has a second through hole 72 having an inner diameter smaller than the outer diameter of the head portion 91 of the screw 90 to correspond to substantially the center position of the second through hole 52A of the fixing portion 5A. Silicon, various resin materials, various metal materials, etc. may be used for the spacer 7.

The embodiment is an embodiment in which the outer diameter of the head portion 91 of the screw 90 (the planar size of the head portion 91) is smaller than the planar sizes of the first through hole 51A and the second through hole 52A of the fixing portion 5A and the position adjustment is also performed. In other words, the planar sizes of the first through hole 51A and the second through hole 52A of the fixing portion 5A are larger than the planar size of the head portion 91 of the screw 90 and the position adjustment is also performed. Specifically, it is assumed that the fixing screw 90 for fixing the piezoelectric drive device 1A to the stage 300A is smaller like e.g. a screw for assembly of a timepiece. In addition, balance with the position adjustment in the case is considered.

In the embodiment, as shown in FIG. 7, the stage 300A to which the piezoelectric drive device 1A is fixed has a coupling and fixing portion 310A the same as the coupling and fixing portion 310 in the first embodiment. The coupling and fixing portion 310A fixes the two fixing portions 5A forming the piezoelectric drive device 1A and the auxiliary fixing portion 3A sandwiched by the two fixing portions 5A via the spacer 7 to the upper surface thereof. In the coupling and fixing portion 310A, screw holes 311A for screwing and fixing the screws 90 are respectively formed to correspond to substantially the center positions of the first through hole 51A and the second through hole 52A of the fixing portion 5A.

The procedure to fix the piezoelectric drive device 1A to the stage 300A is explained.

First, the fixing portion 5A of the piezoelectric drive device 1A is mounted on the upper surface of the coupling and fixing portion 310A of the stage 300A so that the first through hole 51A and the second through hole 52A of the fixing portion 5A of the piezoelectric drive device 1A may be located including the screw holes 311A of the coupling and fixing portion 310A. Then, the spacer 7 is mounted on the upper surface of the upper fixing portion 5A.

Then, the screws 90 are respectively inserted into the first through hole 71 and the second through hole 72 from above the spacer 7 and screwed into the screw holes 311A of the coupling and fixing portion 310A not to incline the screws 90. Under the condition, position adjustment of the piezoelectric drive device 1A is performed on the slider 100. When the position adjustment is finished, the respective screws 90 are screwed into the screw holes 311A to the ends, and thereby, as shown in FIG. 7, the piezoelectric drive device 1A is fixed to the stage 300A via the spacer 7.

The piezoelectric motor 10A of the embodiment has the piezoelectric drive device 1A and the slider 100 as the driven member. The piezoelectric drive device 1A drives the slider 100. However, the piezoelectric motor 10A may have a rotor rotating relative to the rotation axis as a driven member. Also, in this case, the piezoelectric drive device 1A may transmit a drive force to the rotor.

According to the embodiment, the following effects may be exerted in addition to the effects in the first embodiment.

The piezoelectric drive device 1A of the embodiment has the spacer 7 between the fixing portion 5A and the head portion 91 of the screw 90 for fixing the fixing portion 5A. Further, the shape of the first through hole 51A of the fixing portion 5A is formed to be larger than the outer diameter of the head portion 91 of the screw 90. Furthermore, the spacer 7 has the first through hole 71 having the smaller inner diameter than the outer diameter of the head portion 91 of the screw 90.

According to the configuration, the spacer 7 is pressed by the head portion 91 of the screw 90, and thereby, the fixing portion 5A may be fixed by the pressing force of the surface of the spacer 7. Accordingly, the adjustment of the pressing force of the fixing portion 5A for fixing the piezoelectric drive device 1A to the stage 300A becomes easier. Further, angle adjustment may be additionally performed around the screws 90.

3. Third Embodiment

Figure 8:
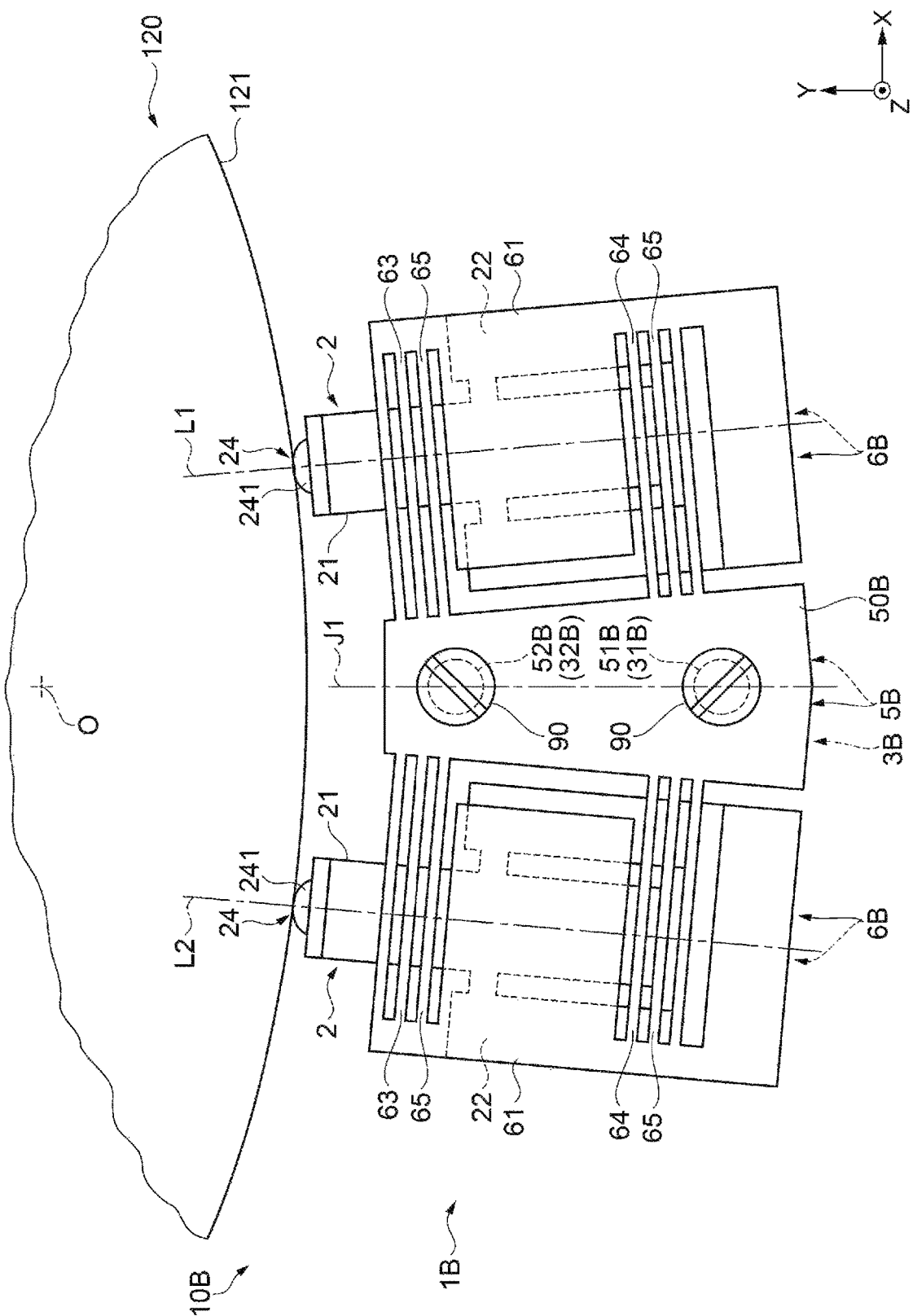
FIG. 8 is a plan view showing a piezoelectric drive device according to a third embodiment.

FIG. 8 is a plan view showing a piezoelectric drive device 1B according to a third embodiment.

A piezoelectric motor 10B of the embodiment is different from the piezoelectric motor 10 of the first embodiment in that a rotor 120 rotating around a rotation axis O is provided as a driven member. Further, the piezoelectric motor 10B includes the rotor 120 and the placement of the piezoelectric drive device 1B for applying a drive force to the rotor 120 is different.

The other configurations are the same as those of the first embodiment. The following description will explain with a focus on the differences from the first embodiment and the explanation of the same configurations will be omitted. In FIG. 8, the same configurations as those of the first embodiment have the same signs. Note that, in the embodiment, the reference holes, the reference pins, etc. are omitted.

As shown in FIG. 8, the piezoelectric motor 10B of the embodiment has the rotor 120 rotating around the rotation axis O as the driven member as described above. Further, in the piezoelectric drive device 1B of the embodiment, with straight lines from the vibrating portions 21 to the transmitting portions 24 of the two vibrators 2 as imaginary lines, the imaginary lines incline toward the rotation axis O side.

Note that, in the embodiment, the imaginary line of the vibrator 2 in the +X-axis direction is an imaginary line L1, and the imaginary line of the vibrator 2 in the −X-axis direction is an imaginary line L2. In the embodiment, the imaginary lines L1, L2 are aligned with directions in which the respective transmitting portions 24 contact a side surface 121 of the rotor 120 and transmit drive forces. Further, the imaginary lines L1, L2 are lines perpendicularly intersecting the tangent lines at the points of intersection with the side surface 121 of the rotor 120. In other words, the imaginary lines L1, L2 incline toward the directions intersecting the rotation axis O of the rotor 120.

In the embodiment, the two vibrators 2 are formed toward the rotation axis O along the imaginary lines L1, L2. Specifically, the vibrating portions 21, the supporting portions 22, the coupling portions 23, and the transmitting portions 24 forming the vibrators 2 are formed toward the rotation axis O along the imaginary lines L1, L2. Further, in the embodiment, two urging portions 6B are formed toward the rotation axis O along the imaginary lines L1, L2. Specifically, the holding parts 61 and the spring parts 63, 64 forming the urging portions 6B are formed toward the rotation axis O along the imaginary lines L1, L2.

As shown in FIG. 8, a fixing portion 5B formed between the two vibrators 2 is formed substantially in a trapezoidal shape in the plan view from the +Z-axis direction because the two vibrators 2 are formed to incline along the imaginary lines L1, L2. Further, an auxiliary fixing portion 3B is formed substantially in a trapezoidal shape in the plan view from the +Z-axis direction to correspond to the fixing portion 5B.

The fixing portion 5B of the embodiment has a plate-like fixing portion main body 50B substantially in a trapezoidal shape. The fixing portion main body 50B has a first through hole 51B at the proximal end side and a second through hole 52B at the distal end side on the center line J1. The auxiliary fixing portion 3B has a first auxiliary through hole 31B to correspond to the first through hole 51B of the fixing portion 5B in the same inner diameter. Further, the auxiliary fixing portion 3B has a second auxiliary through hole 32B to correspond to the second through hole 52B of the fixing portion 5B in the same inner diameter.

Note that the configurations and the forming methods of the fixing portion 5B and the auxiliary fixing portion 3B are the same as those of the first embodiment. The stage for fixing the piezoelectric drive device 1B is not shown, however, screw holes (not shown) are formed to correspond to the first through hole 51B and the second through hole 52B in a coupling and fixing portion (not shown). Further, the coupling and fixing portion fixes the piezoelectric drive device 1B containing the fixing portion 5B by screwing of the screws 90 inserted from the upper first through hole 51B and second through hole 52B.

The rotational movement of the rotor 120 of the embodiment is explained.

The piezoelectric drive device 1B of the embodiment has the same configuration as the piezoelectric drive device 1 of the first embodiment, and the placement of the drive piezoelectric elements 2a to 2f is the same. Accordingly, as shown in FIG. 5, when the drive signal V1 is applied to the piezoelectric elements 2a, 2f, the drive signal V2 is applied to the piezoelectric elements 2c, 2d, and the drive signal V3 is applied to the piezoelectric elements 2b, 2e, the vibrating portion 21 stretchingly vibrates (not shown) in the Y-axis directions and flexurally vibrates (not shown) in inverted S-shapes in the X-axis directions. The stretching vibration in the Y-axis directions and the flexural vibration in the X-axis directions are synthesized, and the distal end part 241 of the transmitting portion 24 makes an elliptic motion to describe an elliptic trajectory (not shown) counterclockwise. Thereby, the rotor 120 rotates around the rotation axis O clockwise.

When the waveforms of the drive signals V1, V3 are switched, the vibrating portion 21 stretchingly vibrates (not shown) in the Y-axis directions and flexurally vibrates (not shown) in S-shapes in the X-axis directions. The stretching vibration in the Y-axis directions and the flexural vibration in the X-axis directions are synthesized, and the distal end part 241 of the transmitting portion 24 makes an elliptic motion to describe an elliptic trajectory (not shown) clockwise. Thereby, the rotor 120 rotates around the rotation axis O counterclockwise.

According to the embodiment, the following effects may be exerted in addition to the effects in the first embodiment.

In the piezoelectric drive device 1B of the embodiment, the driven member is the rotor 120 rotating around the rotation axis O. Further, the imaginary lines L1, L2 from the vibrating portions 21 toward the transmitting portions 24 of the two vibrators 2 incline toward the rotation axis O side.

According to the configuration, in the embodiment, the imaginary lines L1, L2 are lines perpendicularly intersecting the tangent lines at the points of intersection with the side surface 121 of the rotor 120. Therefore, the drive force of the piezoelectric drive device 1B may be transmitted toward the rotation axis O to the rotor 120 rotating around the rotation axis O, and the drive force may be efficiently transmitted to the rotor 120. Further, angle adjustment of the piezoelectric drive device 1B relative to the rotor 120 rotating around the rotation axis O becomes unnecessary. Furthermore, unsymmetrical wear of the distal end part 241 of the transmitting portion 24 may be suppressed.

4. Fourth Embodiment

Figure 9:
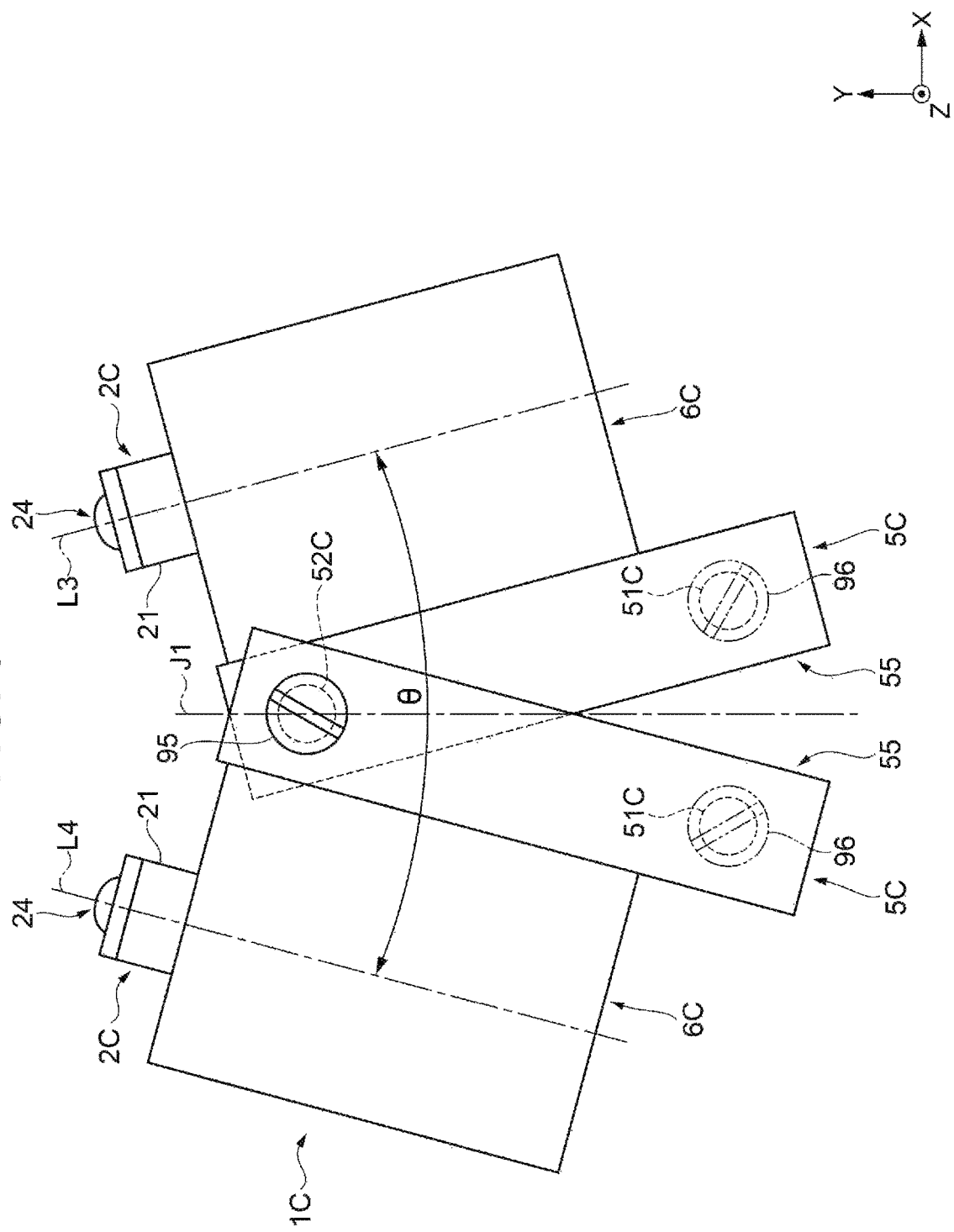
FIG. 9 is a plan view showing a piezoelectric drive device according to a fourth embodiment.

FIG. 9 is a plan view showing a piezoelectric drive device 1C according to a fourth embodiment.

The piezoelectric drive device 1C of the embodiment has two fixing portions 5C compared to the piezoelectric drive device 1 of the first embodiment. The two fixing portions 5C are formed rotatably around a screw 95 as a supporting point. The piezoelectric drive device 1C of the embodiment is an embodiment as a modification of the piezoelectric drive device 1B of the third embodiment.

As shown in FIG. 9, in the piezoelectric drive device 1C, in the fixing portion 5C in the +X-axis direction, a vibrator 2C formed to be the same as the vibrator 2 of the first embodiment and an urging portion 6C formed to be the same as the urging portion 6 of the first embodiment are coupled to the fixing portion 5C in the +X-axis direction. Further, in the piezoelectric drive device 1C, in the fixing portion 5C in the −X-axis direction, a vibrator 2C formed to be the same as the vibrator 2 of the first embodiment and an urging portion 6C formed to be the same as the urging portion 6 of the first embodiment are coupled to the fixing portion 5C in the −X-axis direction.

Here, as is the case with the third embodiment, with straight lines from the vibrating portions 21 to the transmitting portions 24 of the two vibrators 2C as imaginary lines, the imaginary lines incline toward the rotation axis O (FIG. 8) side. The imaginary line of the vibrator 2C in the +X-axis direction is an imaginary line L3, and the imaginary line of the vibrator 2C in the −X-axis direction is an imaginary line L4.

The two fixing portions 5C respectively have first through holes 51C at the proximal end sides. Further, the two fixing portions 5C respectively have second through holes 52 serving as a common through hole at the distal end sides.

When the piezoelectric drive device 1C is fixed to a stage (not shown), the fixing portions 5C are mounted on a coupling and fixing portion (not shown) of the stage. First, angle adjustment of the piezoelectric drive device 1C is performed. In this case, the screw 95 is inserted into the common second through hole 52C and screwed into the coupling and fixing portion. Then, side surfaces 55 at the center side of the two fixing portions 5C are pressed by a jig (not shown) or the like to vary an angle θ between the imaginary lines L3, L4, and thereby, the orientations of the two vibrators 2C are adjusted so that the imaginary lines L3, L4 may move toward a rotation axis (not shown) of a rotor (not shown) as the driven member. After the adjustment of the orientations of the two vibrators 2C, screws 96 are inserted into the respective first through holes 51C and screwed into the coupling and fixing portion, and thereby, the piezoelectric drive device 1C containing the two fixing portions 5C is fixed.

According to the piezoelectric drive device 1C of the embodiment, the fixing portions 5C are separately provided and, even when the size (radius) of the driven member (rotor) changes, the orientations of the two vibrators 2C (angle θ) may be adjusted toward the rotation axis thereof and fixed. Therefore, the drive force of the piezoelectric drive device 1C may be transmitted toward the rotation axis O, and the drive force may be efficiently transmitted to the rotor.

5. Fifth Embodiment

Figure 10:
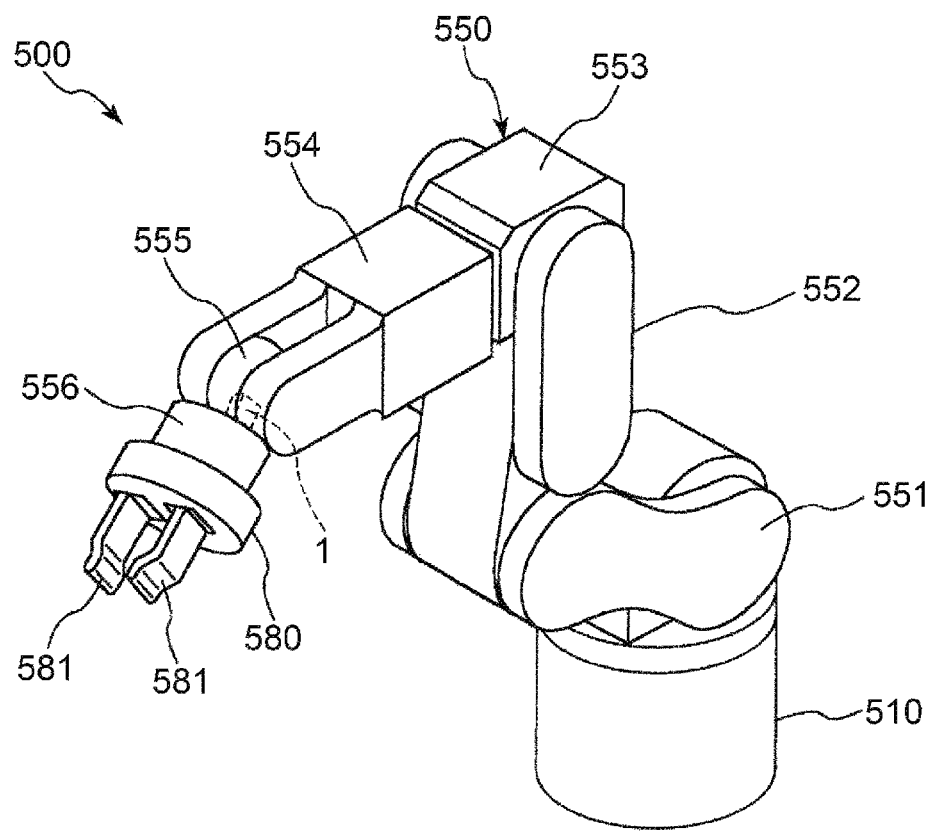
FIG. 10 is a schematic diagram of a robot including an arm according to a fifth embodiment.
Figure 11:
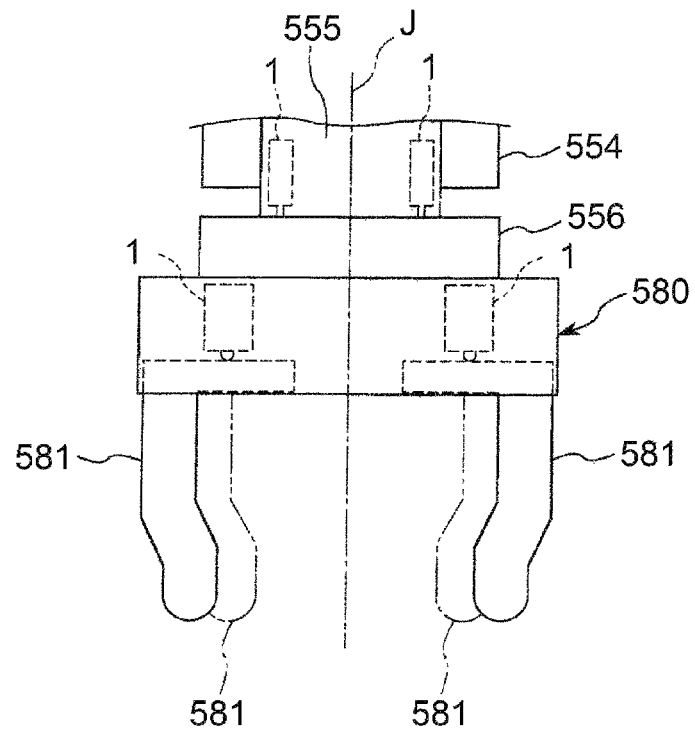
FIG. 11 is an enlarged view of a hand of the robot.

FIG. 10 is a schematic diagram of the robot 500 including an arm 550 according to a fifth embodiment. FIG. 11 is an enlarged view of a hand 580 of the robot 500.

In the embodiment, an example in which the piezoelectric drive device 1 in the first embodiment is applied to the robot 500 is explained. Note that the above described piezoelectric drive devices 1A, 1B may be applied to the robot 500.

The robot 500 shown in FIG. 10 is a six-axis vertical articulated robot and may perform work of feeding, removing, transport, assembly, etc. of precision apparatuses and components forming the apparatuses.

The robot 500 has a base 510, the arm 550 coupled to the base 510, and a force detector (not shown) and the hand 580 provided in the distal end portion of the arm 550. Further, the robot 500 has a plurality of drive sources that generate power for driving the arm 550.

The base 510 is a base portion for attachment of the robot 500 to an arbitrary installation place. The installation place of the base 510 is not particularly limited to, but includes e.g. a floor, a wall, a ceiling, and a movable platform.

The arm 550 includes a first arm 551, a second arm 552, a third arm 553, a fourth arm 554, a fifth arm 555, a sixth arm 556, etc., and these are sequentially coupled from the base 510 side toward the distal end side.

The first arm 551 is coupled to the base 510. To the distal end of the sixth arm 556, e.g. the hand 580 gripping various components or the like is detachably attached. The hand 580 is an end effector and includes two fingers 581. The hand 580 may grip e.g. various components or the like by the two fingers 581.

For the fifth arm 555, a plurality of the piezoelectric drive devices 1 of the first embodiment are used as drive sources for driving the sixth arm 556. Further, a joint unit is provided in the joint part between the first arm 551 and the second arm 552. In the joint unit, a motor (not shown) and a reducer (not shown) are incorporated. Similarly, joint units are provided between the other arms. The respective drive sources are controlled by a control apparatus (not shown).

As shown in FIG. 11, the plurality of piezoelectric drive devices 1 are arranged along the inner circumference of the fifth arm 555 with the transmitting portions 24 directed toward the sixth arm 556. That is, the plurality of piezoelectric drive devices 1 are provided in the joint unit between the fifth arm 555 and the sixth arm 556.

Specifically, the plurality of piezoelectric drive devices 1 are located at the curved side surface side on the top surface as a planar surface of the sixth arm 556 to bring the transmitting portions 24 into contact to apply drive forces. Thereby, the sixth arm 556 may be pivoted around a pivot axis J relative to the fifth arm 555.

Further, the piezoelectric drive devices 1 are used for the hand 580. Specifically, the device is provided for each of the fingers 581 forming the hand 580. The respective piezoelectric drive devices 1 linearly move the corresponding fingers 581 to apply drive forces in directions closer to and directions away from the pivot axis J. Thereby, the two fingers 581 may move in directions closer to or away from each other.

Note that the sixth-axis vertical articulated robot is exemplified as the robot 500 of the embodiment, however, the robot according to the present disclosure is not limited to that. For example, any number of joints may be provided in the robot. Alternatively, the robot can be applied not only to the vertical articulated robot but also to a horizontal articulated robot.

According to the embodiment, the following effects may be exerted.

The robot 500 of the embodiment has the above described piezoelectric drive devices 1.

According to the configuration, the robot 500 has the piezoelectric drive devices 1 that can be downsized, and thereby, the robot 500 may be downsized.

6. Modified Example 1

The piezoelectric drive device 1A using the spacer 7 in the second embodiment may be used for the configuration using the rotor 120 as the driven member shown in the third embodiment. Also, in this case, the effects in the second embodiment may be similarly exerted. This applies to the second embodiment to the fourth embodiment.

7. Modified Example 2

The fixing portion 5 in the first embodiment is integrally formed in coupling to the spring parts 63, 64 of the urging portion 6. However, the configuration is not limited to that, and the fixing portion 5 and the urging portion 6 may be separately formed. This applies to the second embodiment to the fourth embodiment.

What is claimed is:

1. A piezoelectric drive device comprising:
   two vibrators having vibrating portions having piezoelectric elements and transmitting portions placed in the vibrating portions and transmitting drive forces to a driven member; and
   a fixing portion having a through hole into which a pin or a screw is inserted, wherein
   the two vibrators are placed next to each other along a drive direction of the driven member, and
   the fixing portion is placed between the two vibrators and fixing the two vibrators.

2. The piezoelectric drive device according to claim 1, further comprising plate-like urging portions urging the two vibrators toward the driven member, wherein
   the urging portions and the two vibrators are superimposed in a direction perpendicular to the drive direction.

3. The piezoelectric drive device according to claim 2, wherein
   the urging portions and the fixing portion are integrally formed.

4. The piezoelectric drive device according to claim 1, wherein
   the driven member rotates around a rotation axis, and
   imaginary lines from the vibrating portions to the transmitting portions of the two vibrators incline toward the rotation axis side.

5. The piezoelectric drive device according to claim 1, further comprising a spacer between the fixing portion and a head portion of the screw for fixing the fixing portion, wherein an inner diameter of the through hole is larger than an outer diameter of the head portion of the screw, and the spacer has a through hole having an inner diameter smaller than the outer diameter of the head portion of the screw.

6. A robot comprising the piezoelectric drive device according to claim 1.

* * * * *